US012810106B2

(12) United States Patent
Husain et al.

(10) Patent No.: US 12,810,106 B2
(45) Date of Patent: Nov. 24, 2026

(54) GENERATING AND/OR USING TRAINING INSTANCES THAT INCLUDE PREVIOUSLY CAPTURED ROBOT VISION DATA AND DRIVABILITY LABELS

(71) Applicant: GDM Holding LLC, Mountain View, CA (US)

(72) Inventors: Ammar Husain, San Francisco, CA (US); Joerg Mueller, Mountain View, CA (US)

(73) Assignee: GDM Holding LLC, Mountain View, CA (US)

(*) Notice: Subject to any disclaimer, the term of this patent is extended or adjusted under 35 U.S.C. 154(b) by 0 days.

(21) Appl. No.: 19/011,228

(22) Filed: Jan. 6, 2025

(65) Prior Publication Data

US 2025/0139405 A1 May 1, 2025

Related U.S. Application Data

(60) Continuation of application No. 18/358,675, filed on Jul. 25, 2023, now Pat. No. 12,190,221, which is a (Continued)

(51) Int. Cl.
*B25J 9/16* (2006.01)
*G06N 3/008* (2023.01)

(Continued)

(52) U.S. Cl.
CPC .............. *G06N 3/008* (2013.01); *B25J 9/163* (2013.01); *B25J 9/1697* (2013.01); *G06N 20/00* (2019.01);

(Continued)

(58) Field of Classification Search
CPC . B25J 9/16; B25J 9/163; B25J 9/1697; G06K 9/6256; G06K 9/6262; G06N 20/00;

(Continued)

(56) References Cited

U.S. PATENT DOCUMENTS 7,769,491 B2 * 8/2010 Fukuchi ............... G05D 1/0251 701/1
9,744,668 B1 * 8/2017 Russell .................. B25J 9/1666

(Continued)

FOREIGN PATENT DOCUMENTS

| | | |
|---|---|---|
| EP | 3508935 | 7/2019 |
| EP | 3839817 | 6/2021 |
| WO | 2019183568 | 9/2019 |

OTHER PUBLICATIONS

European Patent Office; Communication pursuant to Article 94(3) EPC issued in Application No. 20215716.0; 8 pages; dated May 4, 2023.

(Continued)

*Primary Examiner* — Jonathan L Sample
(74) *Attorney, Agent, or Firm* — Gray Ice Higdon

(57) ABSTRACT

Implementations set forth herein relate to generating training data, such that each instance of training data includes a corresponding instance of vision data and drivability label(s) for the instance of vision data. A drivability label can be determined using first vision data from a first vision component that is connected to the robot. The drivability label(s) can be generated by processing the first vision data using geometric and/or heuristic methods. Second vision data can be generated using a second vision component of the robot, such as a camera that is connected to the robot. The drivability labels can be correlated to the second vision data and thereafter used to train one or more machine learning models. The trained models can be shared with a robot(s) in furtherance of enabling the robot(s) to determine drivability of areas captured in vision data, which is being collected in real-time using one or more vision components.

16 Claims, 7 Drawing Sheets

Related U.S. Application Data division of application No. 16/720,498, filed on Dec. 19, 2019, now Pat. No. 11,741,336.

(51) Int. Cl.

| | |
|---|---|
| ***G06N 20/00*** | (2019.01) |
| ***G06V 10/774*** | (2022.01) |
| ***G06V 10/776*** | (2022.01) |
| ***G06V 20/10*** | (2022.01) |
| ***G06V 20/70*** | (2022.01) |

(52) U.S. Cl.

CPC .......... *G06V 10/774* (2022.01); *G06V 10/776* (2022.01); *G06V 20/10* (2022.01); *G06V 20/70* (2022.01)

(58) Field of Classification Search

CPC .......... G06N 3/008; G06T 2207/20081; G06V 20/10; G06V 20/70; G06V 10/774; G06V 10/776

USPC .................................................. 700/245–264

See application file for complete search history.

(56) References Cited

U.S. PATENT DOCUMENTS

| | | | | |
|---|---|---|---|---|
| 10,078,333 | B1 * | 9/2018 | Bajracharya | B25J 9/1697 |
| 10,369,696 | B1 * | 8/2019 | Russell | B25J 9/1666 |
| 10,583,562 | B2 * | 3/2020 | Stout | B25J 5/00 |
| 10,633,093 | B2 * | 4/2020 | Castillo-Effen | G05D 1/0094 |
| 11,287,826 | B2 * | 3/2022 | Whitman | B25J 19/021 |
| 11,741,336 | B2 | 8/2023 | Husain et al. | |
| 12,190,221 | B2 * | 1/2025 | Husain | B25J 9/163 |
| 2008/0059015 | A1 * | 3/2008 | Whittaker | G05D 1/024 901/1 |
| 2012/0185094 | A1 * | 7/2012 | Rosenstein | B25J 11/009 901/1 |
| 2016/0167226 | A1 * | 6/2016 | Schnittman | G06V 30/1916 901/1 |
| 2017/0329332 | A1 * | 11/2017 | Pilarski | B60W 50/0097 |
| 2018/0194411 | A1 * | 7/2018 | Liivik | B60G 5/00 |
| 2018/0244327 | A1 * | 8/2018 | Liivik | B60G 5/00 |
| 2018/0276986 | A1 * | 9/2018 | Delp | B60K 35/21 |
| 2018/0326982 | A1 * | 11/2018 | Paris | B60W 30/0956 |
| 2019/0208979 | A1 * | 7/2019 | Bassa | A47L 11/4038 |
| 2019/0286153 | A1 * | 9/2019 | Rankawat | G06V 10/82 |
| 2019/0307106 | A1 * | 10/2019 | Hartung | A01K 1/00 |
| 2020/0156246 | A1 * | 5/2020 | Srivastav | G05B 19/42 |
| 2020/0167603 | A1 * | 5/2020 | Ung | G06V 20/70 |
| 2021/0041887 | A1 * | 2/2021 | Whitman | B25J 13/089 |
| 2021/0080970 | A1 * | 3/2021 | Husain | B25J 19/023 |
| 2021/0158041 | A1 * | 5/2021 | Chowdhary | G05D 1/0246 |
| 2021/0316448 | A1 * | 10/2021 | Husain | B25J 9/163 |
| 2021/0358457 | A1 * | 11/2021 | Maeng | G06T 7/0002 |
| 2023/0401419 | A1 | 12/2023 | Husain et al. | |

OTHER PUBLICATIONS

Hadsell, R. et al.; Deep belief net learning in a long-range vision system for autonomous off-road driving; IEEE/RSJ International Conference on Intelligent Robots and Systems; Nice, pp. 628-633; doi: 10.1109/IROS.2008.4651217; dated 2008.

Erkan, A. N. et al.; Adapative long range vision in unstructured terrain; IEEE/RSJ International Conference on Intelligent Robots and Systems; San Diego, CA/USA; pp. 2421-2426; doi: 10.1109/IROS.2007.4399622; dated 2007.

European Patent Office; Communication issued in Application No. 20215716.0; 15 pages; dated Sep. 24, 2021.

European Patent Office; Communication issued in Application No. 20215716.0; 14 pages; dated May 14, 2021.

Eren et al.; SalsaNet: Fast Road and Vehicle Segmentation in LiDAR Point Cluds for Autonomous Driving; ARXIV.org; Cornell University Library; 201 Online Library Cornell University Ithaca; dated Sep. 18, 2019.

Gao et al.; Off-Road Drivable Area Extraction Using 3D LiDAR Date; 2019 IEEE Intelligent Vehicles Symposium (IV); pp. 1505-1511; dated Aug. 26, 2019.

Sock, J. et al.; Probabilistic Traversability Map Generation using 3D-LIDAR and Camera; IEEE—ICRA; 7 pages; dated 2016.

European Patent Office; Communication pursuant to Article 94(3) EPC issued in Application No. 20215716.0; 4 pages; dated Jan. 9, 2025.

European Patent Office; Communication pursuant to Article 94(3) EPC issued in Application No. 20215716.0; 7 pages; dated Apr. 8, 2026.

* cited by examiner

GENERATING AND/OR USING TRAINING INSTANCES THAT INCLUDE PREVIOUSLY CAPTURED ROBOT VISION DATA AND DRIVABILITY LABELS

BACKGROUND

Limitations on processing of raw sensor data that is captured when a robot is traversing relatively unfamiliar terrains can cause the robot to experience delays in decision making-particularly with respect to navigation. Such limitations can result from an inability of the robot to reliably perform real-time analysis of forthcoming terrains that are observable along a current route. Although a robot may be able to reliably estimate drivability of a surface that is directly adjacent to the robot, the robot may not be able to, with the same or similar accuracy, estimate drivability of surfaces that are less proximate to the robot—at least not without further approaching such surfaces. For example, when a robot is traversing a room that the robot has not previously driven through, the robot may employ a heuristic approach to identify surfaces upon which the robot can readily traverse. Such an approach can rely on near-field vision data and can limit the ability of the robot to operate in unfamiliar and/or dynamically changing locations with the same efficiency and accuracy as the robot operates in more familiar terrains.

SUMMARY

Implementations set forth herein relate to generating training instances that each include a corresponding instance of vision data (e.g., data that has been generated using one or more vision components including, but not limited to, a camera and/or a LiDAR device) and corresponding drivability labels for the instance of vision data. Each of the drivability labels can correspond to a portion of the instance of vision data (e.g., a pixel thereof, a group of pixels thereof, a voxel thereof, or a group of voxels thereof) and can indicate, for example, whether a corresponding portion of an environment, captured in the portion of the vision data, is drivable. Implementations additionally or alternatively relate to using the training instances to train a machine learning model that, once trained, can be utilized by a robot to process vision data and make real-time determinations of drivability of locations that the robot may have not encountered. This can eliminate any apparent lag exhibited by those robots during navigation and/or otherwise improve navigation decisions made by the robots. For example, the vision data processed can capture area(s) that are relatively far from the robot at a given time and the machine learning model used to make determination(s) about the drivability of those area(s). While those determinations can be refined as the robot gets closer to those area(s), and/or based on additional vision sensor data from additional sensor(s), being able to make a prediction about the drivability of far away surfaces can enable path planning to occur over longer spatial horizons (and updated as needed).

In some implementations, in generating a training instance, the instance of vision data can be generated using a given vision component and the label data can be generated based on processing other vision data from one or more other vision components. For example, the given vision component can be a monographic camera or stereographic camera capturing two-dimensional (2D) and/or two-and-a-half-dimensional (2.5D) images, and the other vision component can be a light detection and ranging (LIDAR) component capturing 2.5D point clouds. In some of those implementations, the label data is generated automatically (i.e., without human input). In some versions of those implementations, the label data is generated based on, for example, determining portions of the environment that were successfully driven over by the robot, and labeling corresponding portions of the other vision data as drivable. Additionally, those drivable portions that were driven over can optionally be selectively "expanded" to surrounding portion(s) based on the other vision data, capturing those surrounding portion(s), satisfying one or more criteria such as having z-axis values that are within a threshold of the portion(s) driven over, and/or other criterion/criteria. Once the drivable portions of the other vision data are determined, corresponding labels can be propagated to the instance of vision data using a mapping between the given vision component and the other vision component.

As one example, in order to generate an instance of training data for training the one or more machine learning models, a robot can use one or more vision components to capture data that characterizes respective surfaces upon which the robot was or is driving, as well as any surrounding surfaces. In some implementations, the one or more vision components can include a first vision component for capturing first data that characterizes a first portion of an area that is most proximate to the robot. Additionally, the one or more vision components can include a second vision component for simultaneously capturing second data that characterizes a second portion of the area that may be more distant from the robot relative to the first portion of the area. The second data can also optionally characterize all or portions of the first portion that is captured by the first area (i.e., the second portion and the first portion may at least partially overlap). The robot can determine drivability of the first portion of the area using heuristics, geometric algorithms, an accumulation and/or mapping algorithm, and/or any other techniques for determining drivability of a surface and/or volume. Initially, when the robot is closer to the first portion than the second portion, the first data can reliably be used to determine drivability of the first portion, but the second data may be less reliable for determining drivability of the second portion. Regardless, the robot and/or an associated computing device can store the second data and thereafter-when the robot has confirmed drivability of the second portion of the area (e.g., by, for example, approaching and/or driving over the second portion of the area), the second data can be used in combination with one or more instances of label data to generate training data.

When the robot has successfully confirmed whether the second portion of the area is drivable or not drivable, the robot can generate label data that characterizes drivability of the second portion of the area. The second data and label data can then be used as an instance of training data for training the one or more machine learning models. For example, one of the machine learning models can be used to process vision data to generate output that indicates drivability for each of a plurality of portions of the vision data. For instance, the input dimensions of the machine learning model can correspond to the dimensions of an instance of the second vision data, and the output dimensions of the machine learning model can include N separate outputs. Each of the N separate outputs generated based on processing an instance of the second vision data can be a respective drivability measure, and can each correspond to a portion of the instance of the second vision data (e.g., to a corresponding pixel or group of pixels). The robot and/or another robot can then employ the machine learning model to determine, in real-time, drivability of unfamiliar terrain that the robot and/or other robot may encounter.

For example, another robot can receive the machine learning model that has been trained according to the implementations set forth herein. The trained machine learning model can be transmitted from a server device to the other robot via a local area network (e.g., a Wi-Fi network), thereby allowing the other robot to locally make decisions about drivability of various surfaces. When the other robot is navigating through a previously unfamiliar area, the robot can capture vision data using one or more vision components and use the trained machine learning model to determine whether surfaces in the unfamiliar area are traversable. For example, the robot can capture vision data using a camera that can be used to generate image frames, capturing graphical renderings of nearby regions. The vision data can be processed as input to the trained machine learning model in order to generate an output, which can indicate whether one or more portions of the unfamiliar area is drivable. In some implementations, an N-by-M output can be generated using the trained machine learning model, and the N-by-M output can indicate that certain regions of the area are drivable by the other robot, and that certain other regions of the area are not drivable by the other robot.

The above description is provided as an overview of some implementations of the present disclosure. Further description of those implementations, and other implementations, are described in more detail below.

Other implementations may include a non-transitory computer-readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
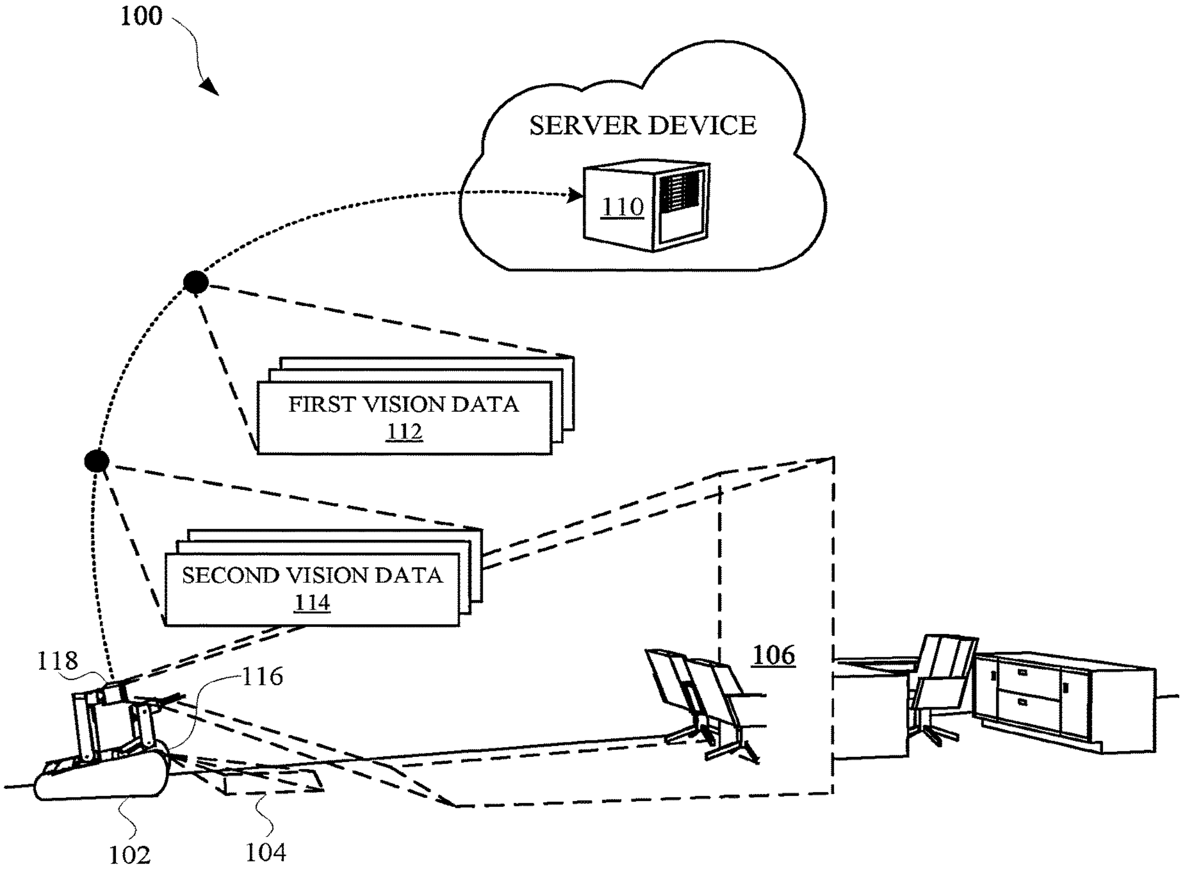
FIG. 1A, FIG. 1B, and FIG. 1C illustrate views of a robot that includes a first vision component and a second vision component for generating training data for training one or more machine learning models regarding drivability of surfaces.
Figure 1B:
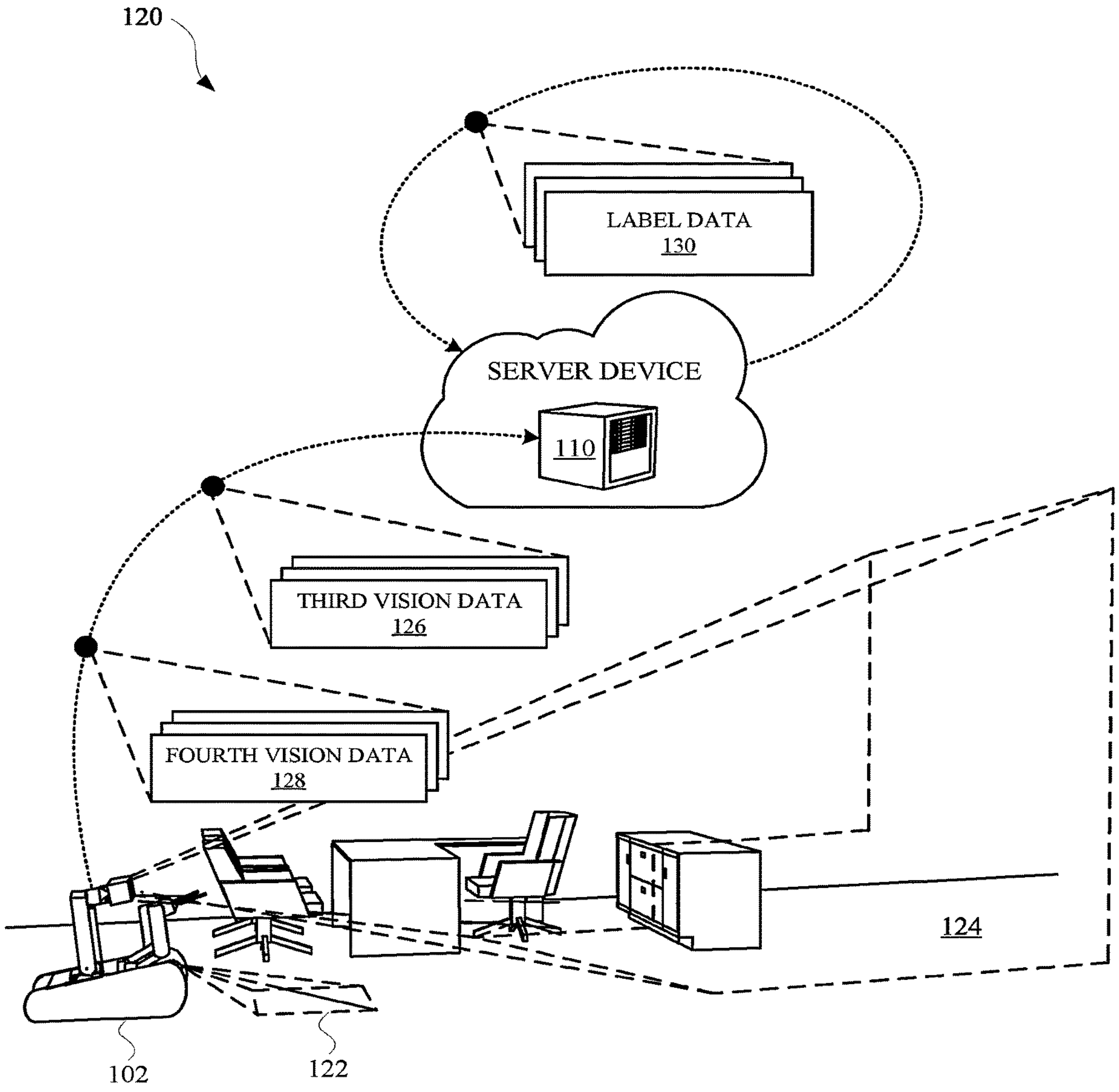
Figure 1C:
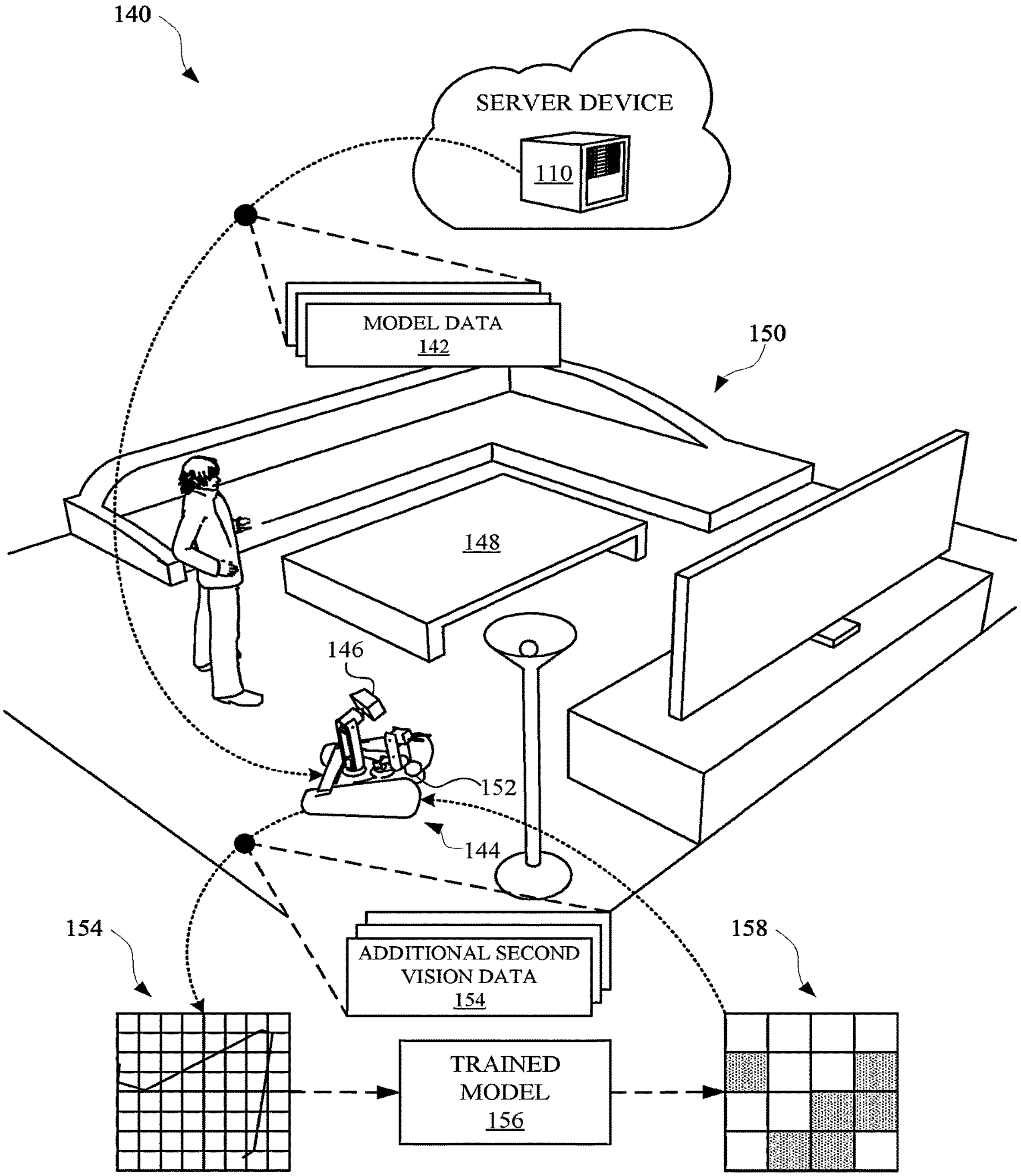

FIG. 1A, FIG. 1B, and FIG. 1C illustrates a view 100, a view 120, and a view 140 of a robot 102 that includes a first vision component 116 and a second vision component 118 for generating training data for learning drivability of surfaces. Each vision component can be, but is not limited to, a monographic camera (e.g., generating 2D RGB images), a stereographic camera (e.g., generating 2.5D RGBD images), and/or a laser scanner (e.g., generating a 2.5D "point clouds"), and/or high-speed cameras (e.g., generating 2D RGB images of reflective markers), and/or any combination thereof, and can be operatively connected to one or more systems and/or apparatuses disclosed herein. In some implementations, the first vision component 116 can be a light detection and ranging (LIDAR) device and the second vision component 118 can be a camera.

When the robot 102 is navigating toward a particular area (e.g., a portion of a room that is adjacent to a desk), the robot 102 can capture first vision data 112, corresponding to a view 104 of a first portion of the area, and second vision data 114, corresponding to a portion of the area. For example, the second vision data 114 can characterize a perspective view 106 of the area, and the first vision data 112 can characterize a perspective view 104 of a portion of a surface adjacent to the robot 102. The portion of the surface characterized by the first vision data 112 can be directly adjacent to the robot 102 while the robot 102 is traveling toward the area. The robot 102, and/or a server device 110 in communication with the robot 102, can determine drivability of the surface in view 104 based at least in part on the first vision data 112. Furthermore, the robot 102 can capture the second vision data 114 in order to generate training data that will allow the robot 102, and/or other robots, to more readily determine drivability of surfaces that may be less proximate to the first vision component 116. In some implementations, the second vision data 114 can optionally characterize all portions, and/or one or more portions, of a particular portion of the area that is captured by the first vision data 112 (e.g., the portion of the area captured by the second vision data 114 can at least partially overlap with another portion of the area that is captured by the first vision data 112).

For example, the robot 102 can include a computing device with one or more processors and one or more memory devices for processing the first vision data 112 and/or the second vision data 114, and/or signals from any other hardware components, in order to determine drivability of any surface in the view 104. Additionally or alternatively, various data can be provided to the server device 110 and the server device 110 can determined drivability of surface(s) in the view 104. The computing device can employ object recognition techniques in order to filter and/or segment vision data according to whether the vision data includes objects with non-drivable surfaces. For instance, the computing device of the robot 102 can process first vision data 112 to identify a type of dynamic object that has entered the view 104 of the first vision component 116. When the dynamic object has been identified, the computing device can further determine whether the dynamic object is a drivable object. In some implementations, a drivable object can refer to an object that the robot 102 can navigate toward and drive over without experiencing an obstruction that would prevent the robot 102 from moving further.

When the computing device determines that the dynamic object is drivable, a portion of the first vision data 112 that characterizes the dynamic object can remain with the first vision data 112. However, when the computing device determines that the dynamic object is non-drivable, the computing device can segment the first vision data 112. The first vision data 112 can be segmented such that a portion of the first vision data 112 that corresponds to the dynamic object is no longer included in the first vision data 112 or is identified as non-drivable in the first vision data 112. In this way, the remaining portion of the first vision data 112 can correspond to areas that do not have recognized objects and/or may include drivable or non-drivable surfaces. The remaining portion of the first vision data 112 can then be further processed to determine drivability of any surfaces characterized by the remaining portion of the first vision data 112. In some implementations, drivability of a surface can be predicted by determining the height of the surfaces, and, particularly, the height corresponding to one or more pixels of vision data. When height corresponding to one or more pixels satisfies a threshold (e.g., a z-threshold), the one or more pixels can be designated as drivable. However, when the height corresponding to the one or more pixels do not satisfy the threshold, the one or more pixels can be designated as non-drivable. The threshold can be, for example, a particular distance, in a normal direction, from a ground surface that was, or is currently, supporting the robot. In some implementations, one or more pixels designated as drivable can be identified as drivable because the robot successfully traversed a surface characterized by the one or more pixels. Additionally, or alternatively, the one or more pixels can be designated as non-drivable because the robot did not successfully, and may or may not have attempted to, drive over a surface characterized by the one or more pixels. The one or more pixels can be correlated to one or more other pixels that (1) are directly adjacent to the one or more pixels in the first vision data 112 and (2) are of the same or similar height (e.g., a particular height within a threshold tolerance of a reference height). Those one or more other neighboring pixels can then be labeled drivable or non-drivable, at least according to whether their corresponding neighbor is also designated as drivable or non-drivable.

FIG. 1B illustrates a view 120 of the robot 102 maneuvering into the area while also capturing further vision data in furtherance of allowing more training data to be generated. The robot 102 can employ the first vision component 116 to generate third vision data 126 characterizing a view 122 of the area, and the second vision component 118 to generate fourth vision data 128 characterizing a view 124 of another area that is further from the area. In some implementations, the first vision data 112 and/or the second vision data 114 can be processed at a server device 110 as a "back end" process. Rather, the server device 110 can generate label data from the first vision data 112 and the second vision data 114, as long as the first vision data 112 and/or the second vision data 114 contain enough information to determine drivability of the area.

In some implementations, label data 130 can be generated from the first vision data 112, the second vision data 114, the third vision data 126, at least an indication that a portion of the area captured in the first vision data 112 is drivable or non-drivable, and/or any combination thereof. In some implementations, drivability of the area can be determined from a heuristics approach and/or can involve the robot 102 further approaching and/or maneuvering over the area after the area has been initially observed by the robot 102 via the first vision component 116. The designation of drivability for one or more surfaces in the area can be determined at the computing device and/or at the server device 110, which can generate label data 130 that designates the one or more surfaces as drivable or non-drivable. The label data 130 and the second vision data 114 can embody an instance of training data that can be used to train one or more machine learning models. In some implementations, the one or more machine learning models can be trained in order that the one or more machine learning models can be used to determine drivability of areas captured in vision data using the second vision component 118.

In some implementations, label data 130 can be correlated to an instance of second vision data 114 based on whether the second vision data 114 characterizes one or more surfaces that are similar to a particular instance of first vision data 112 that the label data 130 corresponds to. Additionally, or alternatively, in order to correlate label data 130 to an instance of second vision data 114 from the second vision component 118, data stored in association with the second vision data 114 can be identified and compared to other data stored in association with the label data 130. For example, the first vision data 112 and/or the second vision data 114 can be generated and/or stored with temporal data and/or locational data. The locational data can characterize relative position and/or a pose of the robot 102 and/or the first vision component 116 when the first vision component 116 captured the first vision data 112. The locational data can also characterize relative position and/or pose of the robot 102 and/or second vision component 118 when the second vision component 118 captured the second vision data 114. Locational data corresponding to each of the first vision data 112 and the second vision data 114 can then be compared to determine whether the robot 102 and/or the first vision component 116—when capturing the first vision data 112—was directed at a particular surface when the robot 102 and/or the second vision component 118 was capturing the second vision data 114. When a determination is made that the first vision data 112 corresponds to the same particular surface captured in the second vision data 114, the label data 128 (e.g., the label data 128 corresponding to the first vision data 112) and the second vision data 114 can be designated as an instance of training data. Furthermore, model data 142 can be trained and/or updated using the instance of training data.

In some implementations, the temporal data can identify a time at which the second vision data 114 was captured, and can be used in combination with position-related data (e.g., historical logs of robot velocity, acceleration, direction, rotation, position, etc.) in order to determine whether there is any label data corresponding to the second vision data 114. Additionally, or alternatively, the locational data that is included in, or stored in associated with, the second vision data 114 can be processed in order to determine whether geographic data (e.g., GPS data generated by a GPS device that is included with, or in communication with, the robot 102) corresponds to the label data 130.

In some implementations, one or more instances of first vision data generated using the first vision component 116 can be used to generate one or more instances of label data 128 that characterize drivability of second vision data 114. For example, multiple instances of first vision data captured at different times using the first vision component 116 can be used to generate label data 128, which can characterize drivability of various portions of an area captured in second vision data 114. The multiple instances of first vision data can be captured using one or more vision components during a short-term and/or long-term data accumulation process, in which the robot 102 creates a semantic map(s) from various accumulated data. For example, the robot 102 can accumulate multiple instances of first vision data using the first vision component 116 to determine whether an area adjacent to a chair is drivable. The multiple instances of first vision data can be captured over time and when the robot 102 and/or the first vision component 116 are oriented in a variety of different directions. Based on this accumulation of instances of first vision data, label data can be generated for characterizing drivability of multiple different portions of the area adjacent to the chair. Thereafter, when the label data has been generated, the robot 102 and/or another robot can generate, using a second vision component, an instance of second vision data that captures at least some or all of the portions of the area adjacent to the chair. The label data can then be correlated to the second vision data in order to generate one or more instances of training data. Therefore, as a result, the one or more instances of training data will be at least partially based on multiple instances of first vision data captured at different times and/or different locations.

When the label data 130 is determined to correspond to an instance of the second vision data 114, this data can be used as an instance of training data for training one or more machine learning models. When the one or more machine learning models have been trained according to the instance of training data, model data 142 embodying one or more trained machine learning models can be provided to the robot 102 and/or other any suitable robot, as provided in view 140 of FIG. 1C. Thereafter, any additional second vision data generated using the second vision component 118 can be processed using the one or more trained machine learning models. This can allow the robot 102 and/or any other robot to more readily determine whether the additional second vision data (e.g., one or more image frames, and/or any other format of picture data) capture(s) drivable surface(s) and/or non-drivable surface(s).

For example, as illustrated in view 140 of FIG. 1C, the robot 102 and/or another robot 144, may, at a later time, maneuver into other unfamiliar areas. The other areas may resemble the area—though the robot 144 may not have actually navigated through the other areas before. Regardless, additional second vision data 154 can be captured via a second vision component 146 and then processed using the one or more trained models 156 (e.g., using the model data 142, which can include the one or more trained machine learning models) in order to determine whether the other areas are drivable or non-drivable. For example, the other robot 144 can receive the model data 142 and process additional second vision data 154 in order to determine whether surfaces (e.g., surface 148) of an unfamiliar area 150 are drivable. Processing of the additional second vision data 154 can therefore leverage model training that was performed using training data (e.g., second vision data 114 and label data 128) and/or vision data captured at various different instances of time and/or using a variety of different robots. For example, the training data that is used for training the trained machine learning model can be based on multiple instances of vision data (e.g., multiple different instances of LiDAR data) captured at different times and from different perspectives of one or more robots. Furthermore, processing of the additional second vision data 154 using the trained model 156 can result in output data 158 that indicates drivability metrics for a plurality of portions that each correspond to a portion of the second vision data.

In the example of FIG. 1C the output data 158 indicates, with shaded portions, portions that are not drivable and indicates, with non-shaded portions, portions that are drivable. For example, the shaded portions can indicate those portions of the output that have measures (e.g., probabilities) indicative of non-drivability (e.g., fail to satisfy a threshold) and the non-shaded portions can indicate those portions that have measures indicative of drivability (e.g., satisfy a threshold). In the example of FIG. 1C, the output data 158 includes 16 separate indications of drivability, with each corresponding to a respective grouping of pixels from the second vision data 154. However, as described herein, there can be a 1:1 mapping between pixels and indications in the output (e.g., the output can indicate drivability for each pixel in the second vision data 154), or other mappings between pixels (or voxels) and indications in the output.

In some implementations, when another area is determined to not be drivable, the robot 102 and/or robot 144 can employ other techniques for confirming and/or overriding the determination made using the one or more machine learning models. For example, the one or more machine learning models can be used to generate a score of drivability for a particular surface and/or a particular area. Additionally, one or more vision data processing techniques can be used to process vision data from a first vision component 152 (e.g., a LIDAR device) to determine a separate score of drivability for the particular surface and/or the particular area. In some implementations, determinations of drivability using the first vision data from the first vision component 152 can be performed using one or more geometric techniques, map data accumulation algorithms, and/or heuristic techniques. Additionally, or alternatively, a score for indicating drivability can be based on processing first vision data (e.g., from the first vision component 152) and/or second vision data (e.g., from the second vision component 146) using one or more geometric techniques and/or one or more heuristic techniques.

When the score is determined to satisfy a threshold and the separate score is determined to satisfy a separate threshold, the corresponding surface can be determined to be drivable by the robot 102. However, when either one or both of the thresholds are not satisfied, the corresponding surface can be determined to not be drivable by the robot 102. In some implementations, the score and the separate score can be combined and processed to determine whether the combination of scores satisfies a particular threshold. When the combination of scores is determined to satisfy the particular threshold, the corresponding surface can be considered drivable. However, when the combination of scores is determined to not satisfy the particular threshold, the corresponding surface can be considered not drivable by the robot 102 and/or another robot.

Figure 2:
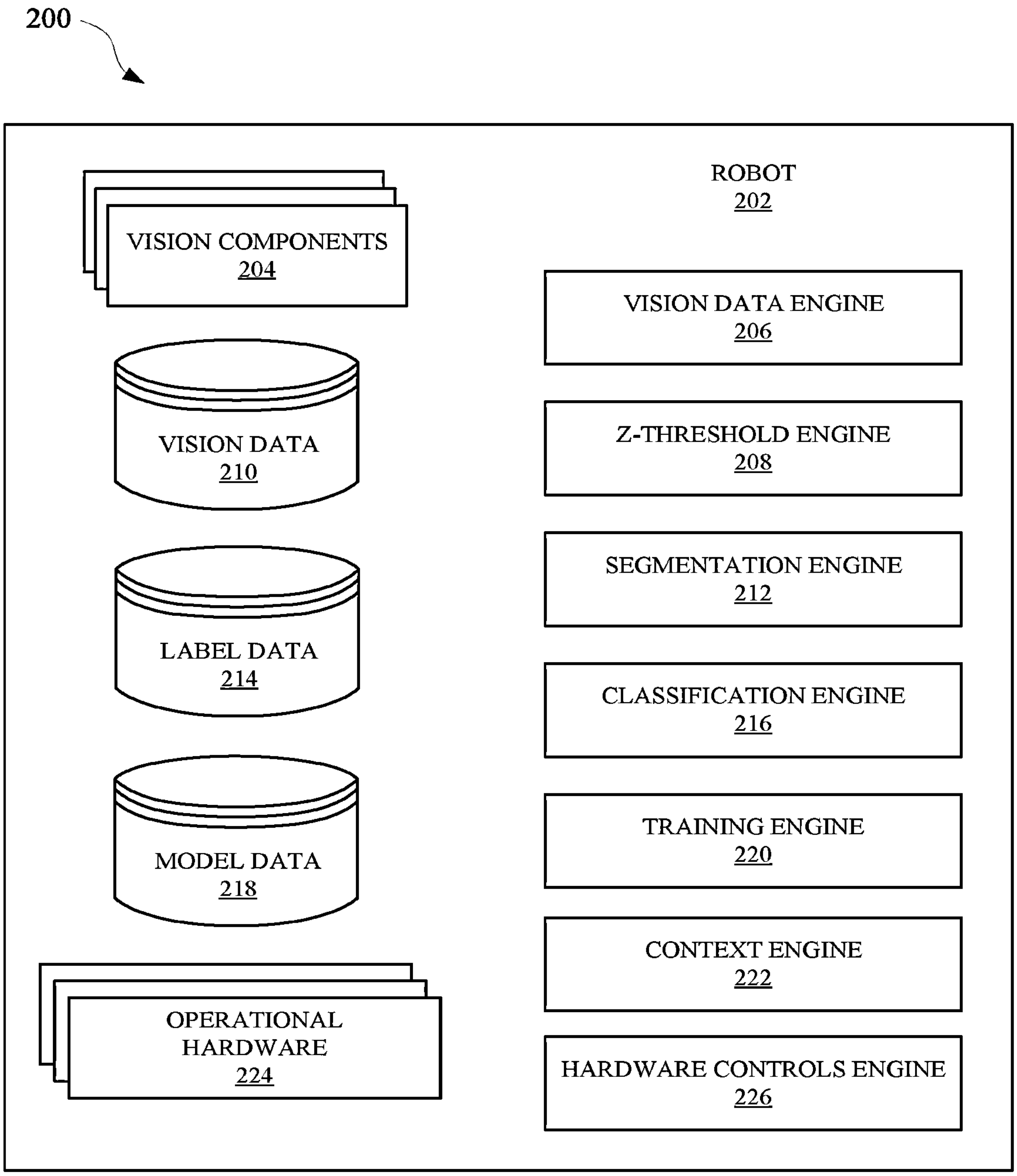
FIG. 2 illustrates a system for generating training data using vision data from multiple different vision components, and using the training data to train one or more machine learning models with respect to drivability of surfaces characterized by the vision data.

FIG. 2 illustrates a system 200 for generating training data using vision data from multiple different vision components, and using the training data to train one or more machine learning models with respect to drivability of surfaces characterized by the vision data. The system 200 can include a robot 202 and/or one or more computing devices that are in communication with the robot 202, such as through a network connection. In this way, one or more operations related to training the one or more machine learning models and/or generating training data can be performed at the robot 202 and/or at the one or more computing devices, such as a remote server device. For example, particular elements of the robot 202 can be incorporated into the robot 202 and/or a remote server device. In some implementations, the robot 202 can include one or more vision components 204, and each vision component can be used to generate respective vision data 210. For example, the vision components 204 can include a first vision component, such as a LIDAR device, and a second vision component, such as a camera. The vision data 210 can include various different types of image data, such as image frames, point cloud data, video data, and/or any other data that can characterize a perspective view.

In some implementations, a vision data engine 206 of the robot 202 can process signals from the one or more vision components 204 in order to generate the vision data 210. Furthermore, the vision data engine 206 can access signals from operational hardware 224, which can include one or more sensors and/or other components, in order to generate metadata associated with the vision data 210. For example, the operational hardware 224 can perform one or more localization techniques that can allow the vision data engine 206 to store location data with each respective instance of vision data 210. Additionally, or alternatively, the operational hardware 224 can include a global position system (GPS) enabled device that can allow the vision data engine 206 to store location data with each respective instance of vision data 210. The operational hardware 224 can also include one or more sensors for determining a current time that the one or more vision components 204 captured vision data 210. The vision data engine 206 can process time data generated using the one or more sensors in order to store timing data with each respective instance of vision data 210. In some implementations, the operational hardware 224 can include one or more devices for determining velocity, acceleration, and/or any other properties that can be associated with a trajectory of the robot 202. This additional data associated with vision data can be used to correlate vision data to label data 214, which can characterize drivability of one or more surfaces characterized by an instance of vision data.

In some implementations, vision data generated by the vision data engine 206 can be processed by a z-threshold engine 208, which can process vision data 210 and/or data from the operational hardware 224 to determine relative height of various surfaces characterized by the vision data 210 and/or the data from the operational hardware 224. In some implementations, the operational hardware 224 can provide feedback indicative of a height of various surfaces that the robot 202 has viewed or otherwise interacted with. For example, vision data generated using the LIDAR vision component can be processed to determine variations in z values (e.g., height estimations) over the area characterized by the vision data. In some implementations, one or more portions of all portions of the vision data can be identified as corresponding to a particular height value. Thereafter, a segmentation engine 212 can process the height values for each instance of vision data in order to isolate portions of vision data that satisfy a particular z-threshold or do not have a corresponding height value.

In some implementations, portions of vision data that cannot be correlated to a particular height value, at least when exclusively using data from a single vision component, can be further processed using data from one or more other sources. For example, when a first vision component 204 of the robot 202 provides first vision data that includes a portion from which height cannot be determined—at least exclusively from the vision data, the robot 202 can further approach the area corresponding to the portion of the first vision data. In some implementations, a robot 202 can collect further vision data about the area corresponding to the portion of the first vision data once the robot 202 has further approached the area. Alternatively, or additionally, the robot 202 can maneuver a second vision component toward, and/or in a direction of, the area in order to collect additional vision data from which the height of the area can be determined. For example, the second vision component can be a camera that is adjustable in three dimensions according to the operational hardware 224 (e.g., one or more motors and/or one or more processors of the robot 202). When the height for the portion of the first vision data is determined, height data can be stored in association with the portion of the first vision data. Alternatively, or additionally, the height for the portion of the first vision data can be used by the segmentation engine 212 to determine whether to segment the portion from the first vision data or allow the portion of the first vision data to remain, at least depending on whether the height is too high for the robot 202 to traverse.

In some implementations, vision data can also be processed by a classification engine 216, which can identify objects characterized by one or more instances of vision data. For example, vision data generated using the second vision component can be processed by the classification engine 216, which can employ one or more machine learning models in order to identify particular objects characterized by the vision data. In some implementations, the classification engine 216 can also employ one or more machine learning models to determine whether an object or surface, characterized by the vision data from any of the vision components 204, corresponds to a drivable or non-drivable surface. In some implementations, the classification engine 216 can also be used to process instances of vision data that have been segmented using the segmentation engine 212. Furthermore, the segmentation engine 212 can segment portions of vision data corresponding to non-drivable objects in order to isolate portions of the vision data characterizing drivable surfaces and/or surfaces whose drivability has yet to be determined. In some implementations, a surface can be considered drivable and/or traversable when the robot is able to autonomously drive over the surface.

In some implementations, the system 200 can include a training engine 220 for generating instances of training data and/or training one or more machine learning models using the training data. The training engine 220 can correlate vision data from one or more vision components 204 to other vision data from one or more other vision components. Alternatively, or additionally, the training engine 220 can correlate vision data 210 to label data 214 in order to generate training data for training one or more machine learning models. The one or more machine learning models, before training and/or after training using the training data, can be stored as model data 218 at the robot 202 and/or any other computing device that can be in communication with the robot 202.

In some implementations, label data 214 that indicates whether a portion of the first vision data is drivable or not drivable can be correlated to an instance of the second vision data. The correlation between the first vision data and second vision data can be based on whether there are one or more identified similarities of one or more surfaces characterized by the first vision data and the second vision data. For example, an identified similarity can be a surface having one or more regions, each with a respective normal trajectory, a respective texture, a respective material, and/or any other quantifiable feature that is within a threshold tolerance.

Alternatively, or additionally, the correlation between the first vision data and the second vision data can be based on metadata or other data that is stored in association with the first vision data and/or the second vision data. For example, the first vision data can be stored in association with geographic data that characterizes a geographic location (e.g., geographic coordinates, a name for a location provided by a user, a name for a location generated by the robot 202, and/or any other identifying information) at which the first vision component captured the first vision data. Furthermore, the second vision data can be stored in association with other geographic data that also characterizes another geographic location at which the second vision component captured the second vision data. When the training engine 220 determines that the geographic data and the other geographic data correspond to the same geographic location, or geographic locations that are within a threshold distance of each other, the training engine 220 can determine whether the first vision data and/or the second vision data have corresponding label data. When the first vision data has corresponding label data indicating drivability of one or more portions of the first vision data, and when the training engine 220 determines that the first vision data and second vision data are correlated (e.g., appear to characterize similar surfaces), the training engine 220 can train one or more machine learning models according to the second vision data and the label data (e.g., the label data corresponding to the first vision data). In other words, second vision data and the label data can be used as an instance of training data for training one or more machine learning models.

As an example, the robot 202 can be navigating through a room while simultaneously capturing first vision data using a first vision component and capturing second vision data using a second vision component. The robot 202 can provide vision data to a separate server device for processing and generating training data according to any of the implementations discussed herein. The separate server device can process the vision data in order to generate label data, which can designate various portions of the vision data, such as a portion of an image frame, as drivable or non-drivable. The separate server device can also correlate instances of vision data, in order that, for example, when the first vision data includes corresponding label data, the second vision data that characterizes similarly composed areas and/or surfaces as the first vision data can be correlated to the first vision data. The separate server device can then train one or more machine learning models using the second vision data and any corresponding label data.

For example, the second vision data can include a two-dimensional, or two-and-a-half dimensional, image frame that characterizes a living room that is also characterized by an instance of first vision data. The instance of first vision data can be stored in association with an instance of label data 214, which can designate a portion of the first vision data, corresponding to, for example, the living room floor, as drivable. The separate server device and/or the robot 202 can correlate the instance of first vision data to the instance of label data, thereby indicating that a portion of the image frame corresponding to the living room floor is a drivable region. One or more machine learning models can be trained using the instance of second vision data and the instance of label data 214 such that, when a similar instance of second vision data is processed using the trained one or more machine learning models, the processing can result in an indication that the similar instance of second vision data includes a drivable region. In some implementations, the processing can result in an indication that a first portion of the second vision data characterizes a drivable region and a second portion, that is different from the first portion, characterizes a non-drivable region. In some implementations, processing of vision data using one or more trained machine learning models can result in one or more regions of an area characterized by the vision data as being designated as drivable, and/or one or more other regions of the area being designated as non-drivable.

When a server device is used to train the one or more machine learning models, the server device can share the one or more trained machine learning models with one or more robots 202. Thereafter, the robots 202 can continue collecting vision data 210 and process the vision data using the one or more trained machine learning models. Determinations regarding drivability of surfaces can be processed at a hardware controls engine 226, which can communicate instructions to operational hardware 224 (e.g., wheels, motors, servos, electromagnetic devices, optical devices, sensors, etc.) of the robot 202, in order that the robot 202 will limit any navigation to drivable surfaces and/or areas.

Figure 3:
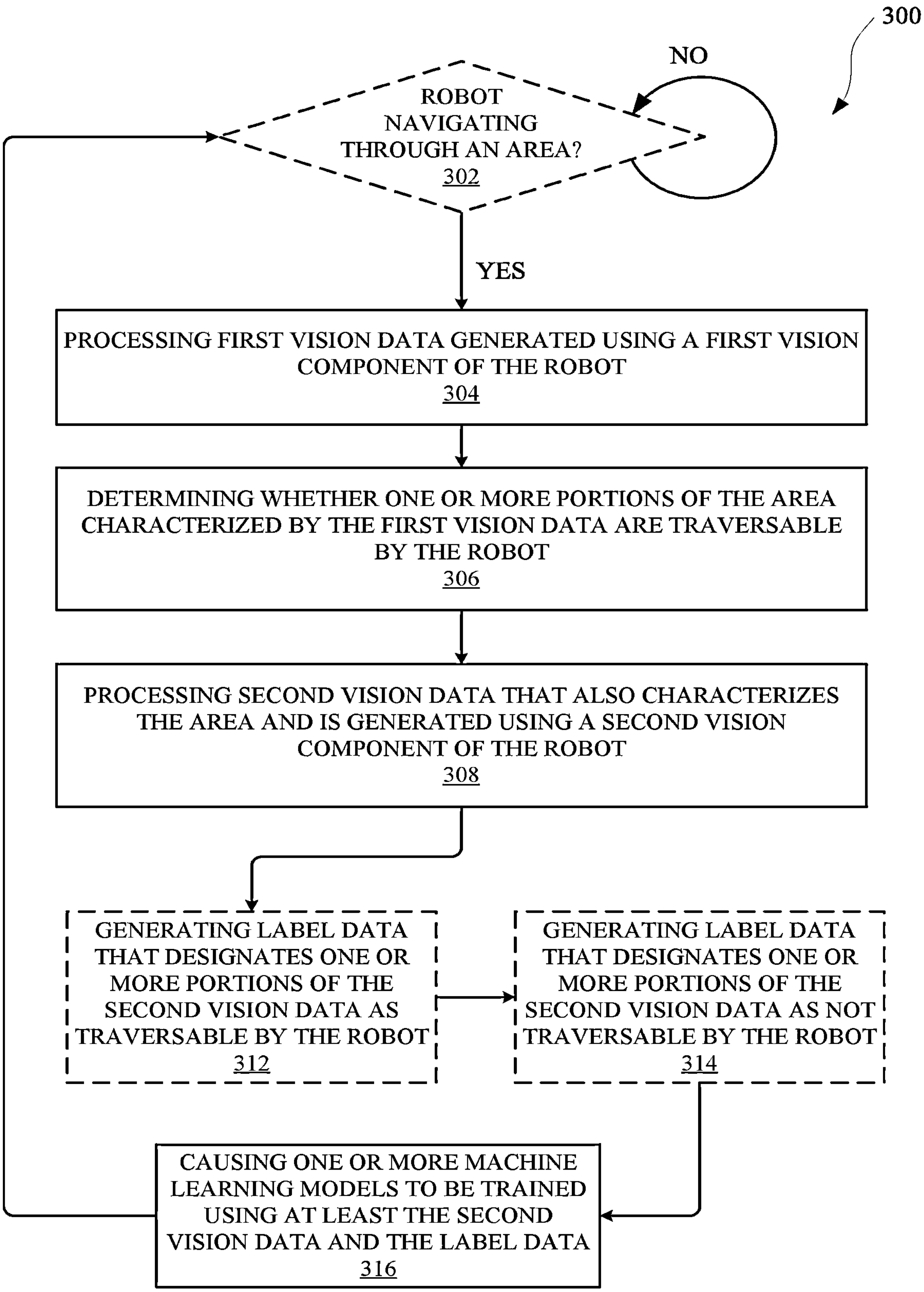
FIG. 3 illustrates a method for generating training data for a machine learning model that can be employed by robot in real-time to assist with determining drivability of various surfaces that the robot may encounter when navigating through various areas.

FIG. 3 illustrates a method 300 for generating training data for a machine learning model that can later be employed to assist, in real-time, with determining drivability of various portions of areas that robots can encounter when navigating through those various areas. The method 300 can be performed by one or more computing devices, applications, and/or any other apparatus or module capable of controlling and/or interacting with a robot. The method 300 can include an operation 302 of determining whether a robot is navigating through an area. When the robot is determined to be navigating through an area, the method 300 can proceed to an operation 304 of processing first vision data that is generated using a first vision component of the robot. Otherwise, the method 300 can optionally continue to monitor whether the robot is navigating through an area. In some implementations, the operation 302 can be an optional operation.

When the operation 304 has been performed, the method 300 can proceed from the operation 304 to an operation 306 of determining whether one or more portions of the area characterized by the first vision data are traversable by the robot. In some implementations, the first vision data can be captured using a LIDAR device, and determining whether one or more portions of the area are traversable can include performing object recognition and/or segmentation in order to isolate certain portions of the first vision data that contain objects that are known to not be drivable or otherwise not traversable by the robot. Regions of the first vision data remaining after segmentation can be processed to determine whether those regions characterize surfaces that are traversable by the robot.

The method 300 can proceed from the operation 306 to an operation 308 that can include processing second vision data that also characterizes the area and is generated using a second vision component of the robot that is different than the first vision component of the robot. For example, the second vision component can be a camera that is mounted on a portion of the robot that allows the camera to be maneuvered in three dimensions and/or 360 degrees. In some implementations, the first vision data can be generated at a different time than the second vision data is generated. For example, the first vision data can be captured by the first vision component when the second vision component is oriented, and/or otherwise facing, away from the area. Additionally, or alternatively, the second vision data can be captured prior to the first vision data being captured, or subsequent to the second vision data being captured—and particularly, the second vision data can be captured when the second vision component is oriented towards the area.

Processing the second vision data can include determining a correlation between the first vision data and the second vision data. For example, metadata stored in association with the first vision data can be compared to metadata stored in association with the second vision data. Comparing the metadata can indicate whether the first vision data and the second vision data were captured at nearby locations, within a threshold distance of each other, and/or at common locations relative to separate positions of the robot. Alternatively, or additionally, determining the correlation between the first vision data and the second vision data can be based on processing the first vision data and the second vision data to determine whether the first vision data and the second vision data characterize similar areas and/or surfaces.

The method 300 can proceed from the operation 308 to an operation 312 and/or an operation 314. The operation 312 can include generating label data that designates at least a portion of the second vision data as traversable by the robot. The method 300 can include an operation 314, which can include generating label data that designates a portion of the second vision data as not traversable by the robot. In some instances, the operation 312 and/or the operation 314 can be optional based on whether one or more portions are determined to be traversable or not traversable.

The method 300 can proceed from the operation 314 to the operation 316, or, optionally, proceed from the operation 312 to the operation 316. The operation 316 can include causing one or more machine learning models to be trained using at least the second vision data and the label data. For example, the second vision data can be designated as an instance of training input; the label data can be designated as an instance of training output; and the model can be further trained using the training input and the training output. As a result, when subsequently-generated second vision data is processed using the trained model, the resulting output of the processing can indicate that the second vision data characterizes portions of a particular area as drivable and/or other portions of the particular area as non-drivable.

Figure 4:
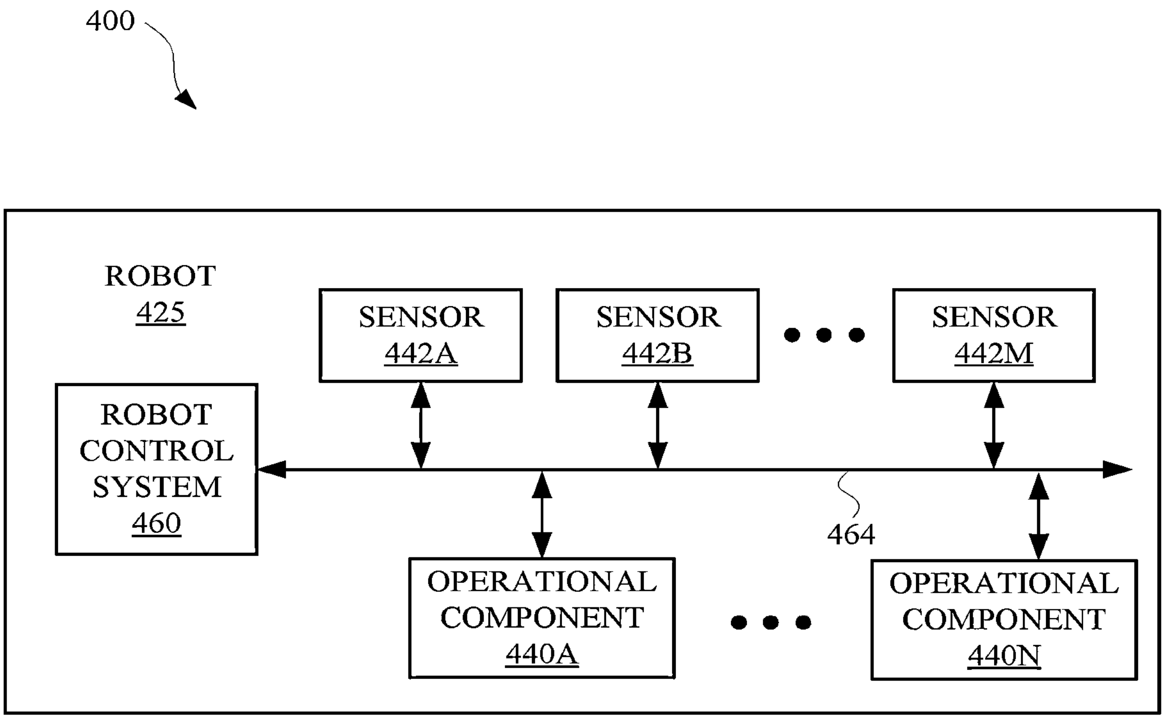
FIG. 4 schematically depicts an example architecture of a robot.

FIG. 4 schematically depicts an example architecture of a robot 425. The robot 425 includes a robot control system 460, one or more operational components 440A-440N, and one or more sensors 442A-442M. The sensors 442A-442M may include, for example, vision components, light sensors, pressure sensors, pressure wave sensors (e.g., microphones), proximity sensors, accelerometers, gyroscopes, thermometers, barometers, and so forth. While sensors 442A-442M are depicted as being integral with robot 425, this is not meant to be limiting. In some implementations, sensors 442A-442M may be located external to robot 425, e.g., as standalone units.

Operational components 440A-440N may include, for example, one or more end effectors and/or one or more servo motors or other actuators to effectuate movement of one or more components of the robot. For example, the robot 425 may have multiple degrees of freedom and each of the actuators may control actuation of the robot 425 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 460 may be implemented in one or more processors, such as a CPU, GPU, and/or other controller(s) of the robot 425. In some implementations, the robot 425 may comprise a "brain box" that may include all or aspects of the control system 460. For example, the brain box may provide real-time bursts of data to the operational components 440A-440N, with each of the real-time bursts comprising a set of one or more control commands that dictate, inter alia, the parameters of motion (if any) for each of one or more of the operational components 440A-440N. In some implementations, the robot control system 460 may perform one or more aspects of one or more methods described herein.

As described herein, in some implementations all or aspects of the control commands generated by control system 460 can be generated based on 3D bounding shapes generated according to techniques described herein. Although control system 460 is illustrated in FIG. 4 as an integral part of the robot 425, in some implementations, all or aspects of the control system 460 may be implemented in a component that is separate from, but in communication with, robot 425. For example, all or aspects of control system 460 may be implemented on one or more computing devices that are in wired and/or wireless communication with the robot 425, such as computer system 510.

Figure 5:
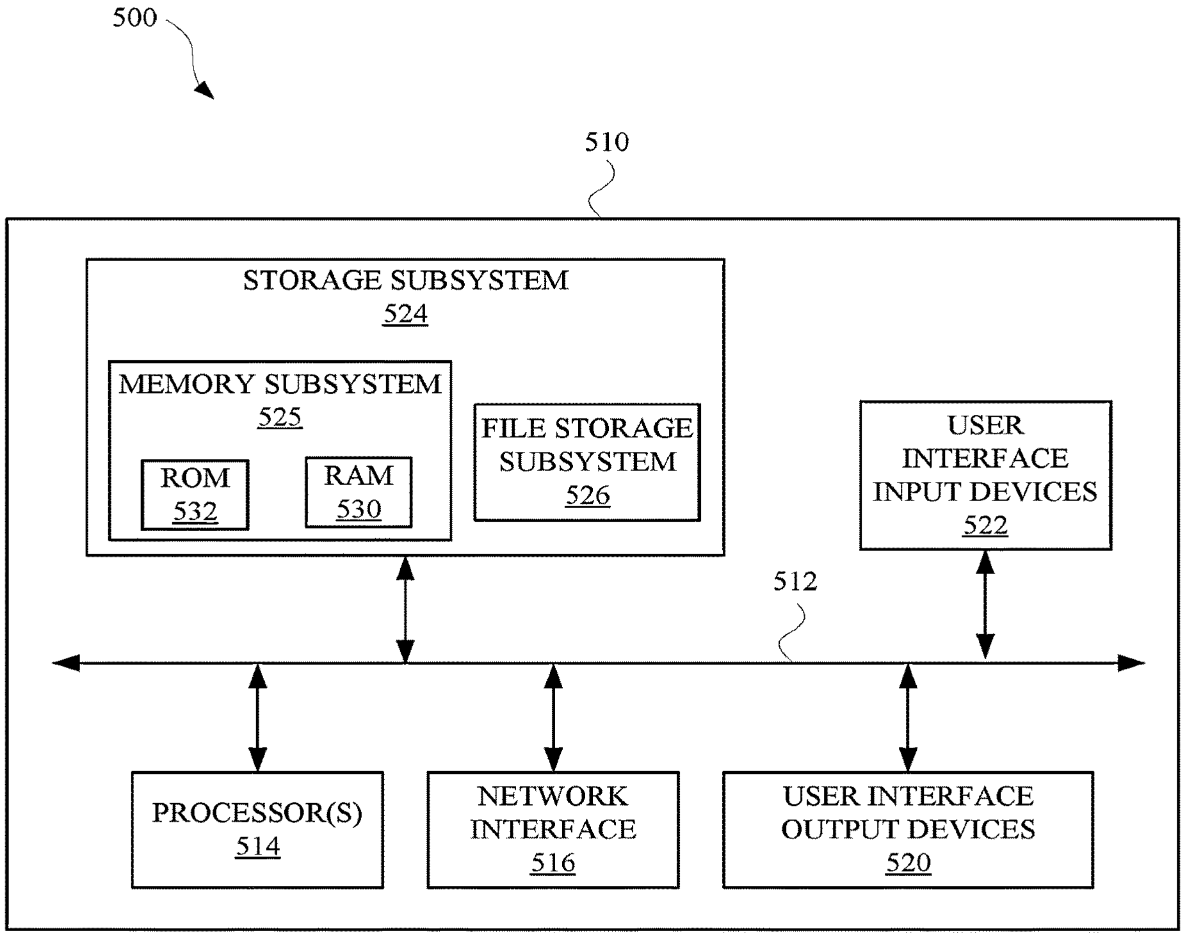
FIG. 5 is a block diagram of an example computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 300 and/or to implement one or more of robot 102, robot 202, system 200, robot 425, and/or any other apparatus, engine, and/or module discussed herein.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors of a robot is set forth as including operations such as processing first vision data that is generated using one or more first vision components that are connected to the robot, wherein the first vision data characterizes an area that the robot was or is traversing. The method can further include an operation of determining, based on processing the first vision data, that the area includes a surface that is traversable by the robot. The method can further include an operation of processing second vision data that also characterizes the area, wherein the second vision data is generated using one or more second vision components that are: separate from the one or more first vision components, and also connected to the robot. The method can further include an operation of generating, based on determining that the surface is traversable by the robot, label data that designates a portion of the second vision data, that corresponds to the surface, as being traversable by the robot. The method can further include an operation of, subsequent to generating the label data: causing a machine learning model to be trained using the second vision data and the label data.

In some implementations, processing the first vision data includes: identifying, based on the first vision data, one or more particular objects that are present in the area, and determining a height of the one or more particular objects relative to a ground surface that is supporting the robot when the one or more first vision components captured the first vision data, wherein determining that the area includes the surface that is traversable by the robot is at least partially based on the height of the one or more particular objects. In some implementations, processing the first vision data includes: processing portions of the first vision data that do not correspond to one or more particular objects identified, via the first vision data, as present in the area, wherein determining that the area includes the surface that is traversable by the robot is at least partially based on processing the portions of the first vision data that do not correspond to one or more particular objects identified.

In some implementations, the method can further include an operation of, subsequent to generating the label data and causing the machine learning model to be trained using the second vision data and the label data: transmitting the machine learning model to a separate robot that is different from the robot that was or is traversing the area. In some implementations, subsequent to generating the label data and causing the machine learning model to be trained using the second vision data and the label data: causing the separate robot to operate according to the machine learning model that was trained using the second vision data and the label data. In some implementations, causing the separate robot to operate according to the machine learning model comprises: causing the separate robot to process third vision data, using the machine learning model, in order to determine whether a particular surface, which is in a separate area in which the separate robot is located, is traversable, wherein the third vision data is generated using one or more third vision components that are connected to the separate robot.

In some implementations, the method can further include an operation of, subsequent to generating the label data and causing the machine learning model to be trained using the second vision data and the label data: processing third vision data using the machine learning model, wherein the third vision data characterizes another surface of another area that the robot, or another robot, is approaching. In some implementations, subsequent to generating the label data and causing the machine learning model to be trained using the second vision data and the label data: determining, based on processing the third vision data using the machine learning model, whether the other surface of the other area is traversable by the robot or the other robot, and causing the robot or the other robot to operate according to whether the other surface of the other area is traversable by the robot or the other robot. In some implementations, the method can further include an operation of, subsequent to generating the label data and causing the machine learning model to be trained using the second vision data and the label data: processing fourth vision data, without using the machine learning model, to determine whether the other surface of the other area is traversable by the robot or the other robot, wherein the fourth vision data is generated using a vision component that is different from a separate vision component that was used to generate the third vision data.

In other implementations, a method implemented by one or more processors of a robot is set forth as including operations such as generating first vision data using one or more first vision components that are connected to the robot, wherein the first vision data characterizes a portion of an area that the robot is approaching. The method can further include an operation of determining, based on the first vision data, whether the portion of the area includes a surface that is traversable by the robot. The method can further include an operation of generating second vision data that characterizes a separate portion of the area, wherein the second vision data is generated using one or more second vision components that are: separate from the one or more first vision components, and also connected to the robot. The method can further include an operation of determining, based on the second vision data, whether an additional surface included in the separate portion of the area is traversable by the robot, wherein determining whether the additional surface that is traversable by the robot is performed using one or more machine learning models, and wherein the one or more machine learning models are trained using one or more instances of training data that include vision data characterizing one or more particular surfaces and label data characterizing drivability of the one or more particular surfaces. The method can further include an operation of causing the robot to operate according to whether the surface and the additional surface are determined to be traversable.

In some implementations, determining whether the portion of the area includes the surface that is traversable by the robot includes: identifying, based on the first vision data, one or more particular objects that are present in the area, and determining a height of the one or more particular objects relative to a ground surface that is supporting the robot when the one or more first vision components captured the first vision data, wherein determining whether the portion of the area includes the surface that is traversable by the robot is at least partially based on the height of the one or more particular objects. In some implementations, determining whether the portion of the area includes the surface that is traversable by the robot includes: processing portions of the first vision data that do not correspond to one or more particular objects identified, via the first vision data, as present in the area, wherein determining whether the portion of the area includes the surface that is traversable by the robot is at least partially based on processing the portions of the first vision data that do not correspond to one or more particular objects identified.

In some implementations, the method can further include an operation of, prior to generating the second vision data: receiving the one or more machine learning models from a separate computing device that is in communication with the robot. In some implementations, the one or more first vision components includes a LIDAR device and the one or more second vision components include a camera. In some implementations, determining whether the portion of the area includes the surface that is traversable by the robot includes determining whether the robot can autonomously drive over the surface.

In yet other implementations, a robot is set forth as including one or more processors, and memory storing instructions that, when executed by the one or more processors, cause the one or more processors to perform operations that include: generating first vision data using one or more first vision components that are in communication with the one or more processors, wherein the first vision data characterizes a portion of an area that is within a viewable region of the one or more first vision components. The operations can further include an operation of determining, based on the first vision data, whether the portion of the area includes a surface that is traversable. The operations can further include an operation of generating second vision data that characterizes a separate portion of the area, wherein the second vision data is generated using one or more second vision components that are: separate from the one or more first vision components, and also in communication with the one or more processors. The operations can further include an operation of determining, based on the second vision data, whether an additional surface included in the separate portion of the area is traversable, wherein determining whether the additional surface that is traversable is performed using one or more machine learning models, and wherein the one or more machine learning models are trained using one or more instances of training data that characterize drivability of one or more particular surfaces. The operations can further include an operation of operating according to whether the surface and the additional surface are determined to be traversable.

In some implementations, determining whether the portion of the area includes the surface that is traversable includes: identifying, based on the first vision data, one or more particular objects that are present in the area, and determining a height of the one or more particular objects relative to a ground surface, wherein determining whether the portion of the area includes the surface that is traversable is at least partially based on the height of the one or more particular objects. In some implementations, determining whether the portion of the area includes the surface that is traversable includes: processing portions of the first vision data that do not correspond to one or more particular objects identified, via the first vision data, as present in the area, wherein determining whether the portion of the area includes the surface that is traversable is at least partially based on processing the portions of the first vision data that do not correspond to one or more particular objects identified.

In some implementations, the operations further include, prior to generating the second vision data: receiving the one or more machine learning models from a separate computing device that is in communication with the one or more processors. In some implementations, determining whether the portion of the area includes the surface that is traversable includes determining whether the surface can be autonomously driven over by one or more particular robots.

We claim:

1. A method implemented by one or more processors of a robot, the method comprising:

generating, at a first time, first vision data using one or more first vision components that are connected to the robot, wherein the first vision data characterizes a portion of an area that the robot is approaching;

determining, based on processing the first vision data using a machine learning model, that the portion of the area includes a surface that is traversable by the robot;

causing the robot to operate according to the determination that the portion of the area includes the surface that is traversable by the robot;

generating, at a second time, second vision data that characterizes the portion of the area, wherein the second time is subsequent to the first time and is during the robot operating according to the determination that the portion of the area includes the surface that is traversable by the robot, and wherein the second vision data is generated using one or more second vision components that are:

separate from the one or more first vision components, and also connected to the robot;

determining, based on processing the second vision data without using the machine learning model, that the portion of the area is not traversable by the robot; and causing the robot to adjust its operation to operate according to the determination that the portion of the area is not traversable by the robot.

2. The method of claim 1, wherein determining, based on processing the second vision data without using the machine learning model, that the portion of the area is not traversable by the robot includes:

identifying, based on the second vision data, one or more particular objects that are present in the area, and determining a height of the one or more particular objects relative to a ground surface that is supporting the robot when the one or more second vision components captured the second vision data, wherein determining that the portion of the area is not traversable by the robot is at least partially based on the height of the one or more particular objects.

3. The method of claim 1, wherein determining, based on processing the second vision data without using the machine learning model, that the portion of the area is not traversable by the robot includes:

processing portions of the second vision data that do not correspond to one or more particular objects identified, via the second vision data, as present in the area, and determining that the portion of the area is not traversable by the robot at least partially based on processing the portions of the second vision data that do not correspond to one or more particular objects identified.

4. The method of claim 1, wherein the machine learning model is trained using one or more instances of training data that include vision data characterizing one or more particular surfaces and label data characterizing drivability of the one or more particular surfaces.

5. The method of claim 1, wherein the one or more second vision components include a LIDAR device.

6. The method of claim 5, wherein the one or more first vision components include a camera.

7. The method of claim 6, wherein the one or more second vision components consist of the LIDAR device and wherein the one or more first vision components consist of the camera.

8. The method of claim 1, wherein determining that the portion of the area includes the surface that is traversable by the robot includes determining whether the robot can autonomously drive over the surface.

9. A robot, comprising:

a first vision component;

a second vision component that is separate from the first vision component one or more processors; and memory storing instructions that, when executed by the one or more processors, cause the one or more processors to perform operations that include:

generating, at a first time, first vision data using the first vision component, wherein the first vision data characterizes a portion of an area that the robot is approaching;

determining, based on processing the first vision data using a machine learning model, that the portion of the area includes a surface that is traversable by the robot;

causing the robot to operate according to the determination that the portion of the area includes the surface that is traversable by the robot;

generating, at a second time, second vision data using the second vision component, wherein the second vision data characterizes the portion of the area, and wherein the second time is subsequent to the first time and is during the robot operating according to the determination that the portion of the area includes the surface that is traversable by the robot, and determining, based on processing the second vision data without using the machine learning model, that the portion of the area is not traversable by the robot; and causing the robot to adjust its operation to operate according to the determination that the portion of the area is not traversable by the robot.

10. The robot of claim 9, wherein determining, based on processing the second vision data without using the machine learning model, that the portion of the area is not traversable by the robot includes:

identifying, based on the second vision data, one or more particular objects that are present in the area, and determining a height of the one or more particular objects relative to a ground surface that is supporting the robot when the second vision component captured the second vision data, wherein determining that the portion of the area includes the surface that is not traversable by the robot is at least partially based on the height of the one or more particular objects.

11. The robot of claim 9, wherein determining, based on processing the second vision data without using the machine learning model, that the portion of the area is not traversable by the robot includes:

processing portions of the second vision data that do not correspond to one or more particular objects identified, via the second vision data, as present in the area, and determining that the portion of the area is not traversable by the robot at least partially based on processing the portions of the second vision data that do not correspond to one or more particular objects identified.

12. The robot of claim 9, wherein the machine learning model is trained using one or more instances of training data that include vision data characterizing one or more particular surfaces and label data characterizing drivability of the one or more particular surfaces.

13. The robot of claim 9, wherein the second vision component is a LIDAR device.

14. The robot of claim 13, wherein the first vision component is a stereographic camera.

15. The robot of claim 9, wherein the first vision component is a stereographic camera.

16. The robot of claim 9, wherein determining that the portion of the area includes the surface that is traversable by the robot includes determining whether the robot can autonomously drive over the surface.

* * * * *